US012296950B1

(12) United States Patent
Davis

(10) Patent No.: US 12,296,950 B1
(45) Date of Patent: May 13, 2025

(54) AIRCRAFT NOTIFICATION SYSTEM FOR A BLENDED WING BODY AIRCRAFT AND METHOD OF USE

(71) Applicant: JetZero, Inc., Long Beach, CA (US)

(72) Inventor: Bethany Davis, Delray Beach, FL (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/415,972

(22) Filed: Jan. 18, 2024

(51) Int. Cl.
| | |
|---|---|
| *B64C 25/14* | (2006.01) |
| *B64C 25/34* | (2006.01) |
| *B64C 39/02* | (2023.01) |
| B64C 25/00 | (2006.01) |
| B64C 39/10 | (2006.01) |
| B64D 45/00 | (2006.01) |

(52) U.S. Cl.
CPC ............ *B64C 39/024* (2013.01); *B64C 25/34* (2013.01); *B64C 2025/008* (2013.01); *B64C 2039/105* (2013.01); *B64D 45/0005* (2013.01)

(58) Field of Classification Search
CPC . B64C 39/024; B64C 25/34; B64C 2025/008; B64C 2039/105; B64D 45/0005
See application file for complete search history.

(56) References Cited

U.S. PATENT DOCUMENTS

| | | | |
|---|---|---|---|
| 1,716,439 A | 6/1929 | Edrington | |
| 1,810,244 A | 6/1931 | Hicks | |
| 1,853,232 A | 4/1932 | Alfred | |
| 2,138,326 A | 11/1938 | Robert | |
| 4,524,929 A | 6/1985 | Gebhard | |
| 4,687,158 A | 8/1987 | Kettering | |
| 6,568,632 B2 | 5/2003 | Page et al. | |
| 7,143,975 B2 | 12/2006 | Udall | |
| 7,249,736 B2 | 7/2007 | Clark | |
| 8,774,986 B1 | 7/2014 | Theriault et al. | |
| 8,780,174 B1 * | 7/2014 | Rawdon | H04N 23/683 348/43 |
| 10,150,558 B2 | 12/2018 | Page | |

(Continued)

FOREIGN PATENT DOCUMENTS

| | | |
|---|---|---|
| FR | 3018501 A1 | 12/2017 |
| GB | 1593393 A | 7/1981 |

OTHER PUBLICATIONS

Rizzi, Landing Gear Design for Blended Wing Body Flight Test Demonstrations, Dec. 5, 2018.

(Continued)

*Primary Examiner* — Hongmin Fan
(74) *Attorney, Agent, or Firm* — Caldwell Intellectual Property Law

(57) ABSTRACT

An aircraft notification system, the aircraft notification system having a processor and a memory communicatively connected to the processor, the memory containing instructions configuring the processor to receive aircraft angle data from a blended wing body aircraft (BWB) having a main body and a wing with no clear demarcation between the wings and the main body along a leading edge of the aircraft, determine an aircraft orientation as a function of the aircraft angle data, wherein the aircraft orientation comprises at least a pitch angle of the BWB while the BWB is in contact with a ground surface, transmit the aircraft orientation to an aircraft display system and visually display the aircraft orientation through the aircraft display system.

20 Claims, 8 Drawing Sheets

(56) References Cited

U.S. PATENT DOCUMENTS

| | | |
|---|---|---|
| 11,186,359 B2 | 11/2021 | Page |
| 11,433,991 B2 | 9/2022 | Whitlock et al. |
| 11,453,483 B2 | 9/2022 | Page |
| 11,801,932 B2 | 10/2023 | Schuster et al. |
| 2018/0001999 A1 | 1/2018 | Page |
| 2018/0362161 A1* | 12/2018 | Banerjee ............... B64C 3/14 |
| 2019/0086936 A1 | 3/2019 | Schrage et al. |
| 2019/0389581 A1 | 12/2019 | Chittick et al. |
| 2020/0207463 A1 | 7/2020 | Schuster et al. |
| 2020/0207464 A1 | 7/2020 | Whitlock et al. |
| 2022/0194565 A1 | 6/2022 | Wilson |
| 2022/0388633 A1 | 12/2022 | Page et al. |
| 2024/0051659 A1* | 2/2024 | Schuster ............... B64C 25/26 |

OTHER PUBLICATIONS

Jenkins, E.S., and Donovan, A.F., "Tricycle Landing Gear Design—Part 1", Journal of the Aeronautical Sciences, vol. 9, No. 10, pp. 385-396, Aug. 1942, doi: 10.2514/8.10912 (Year: 1942).

\* cited by examiner

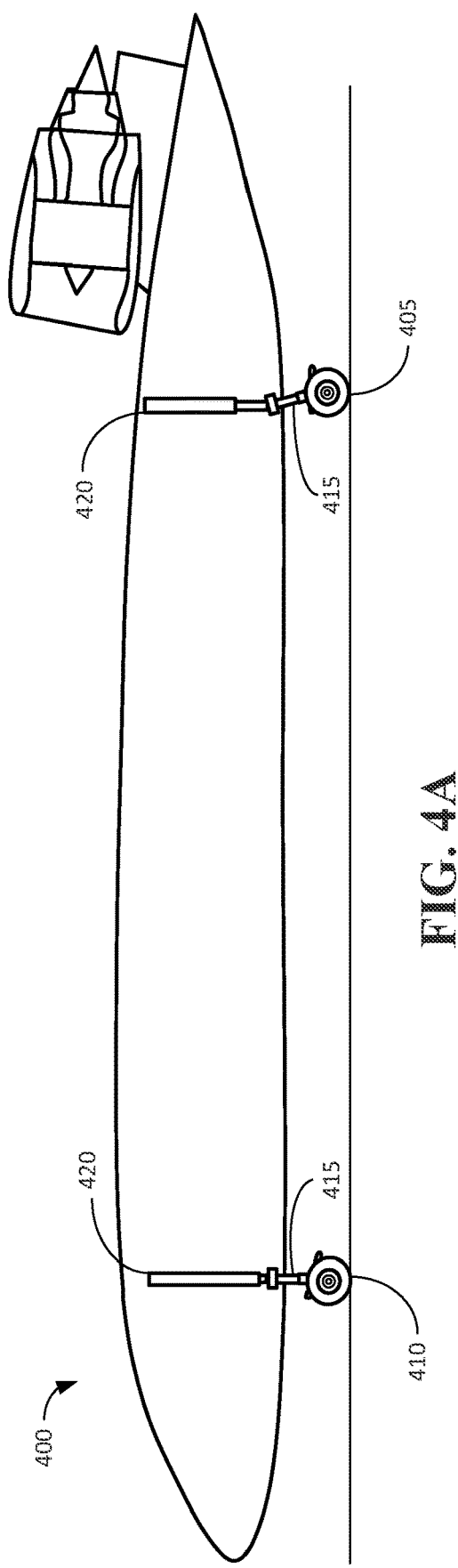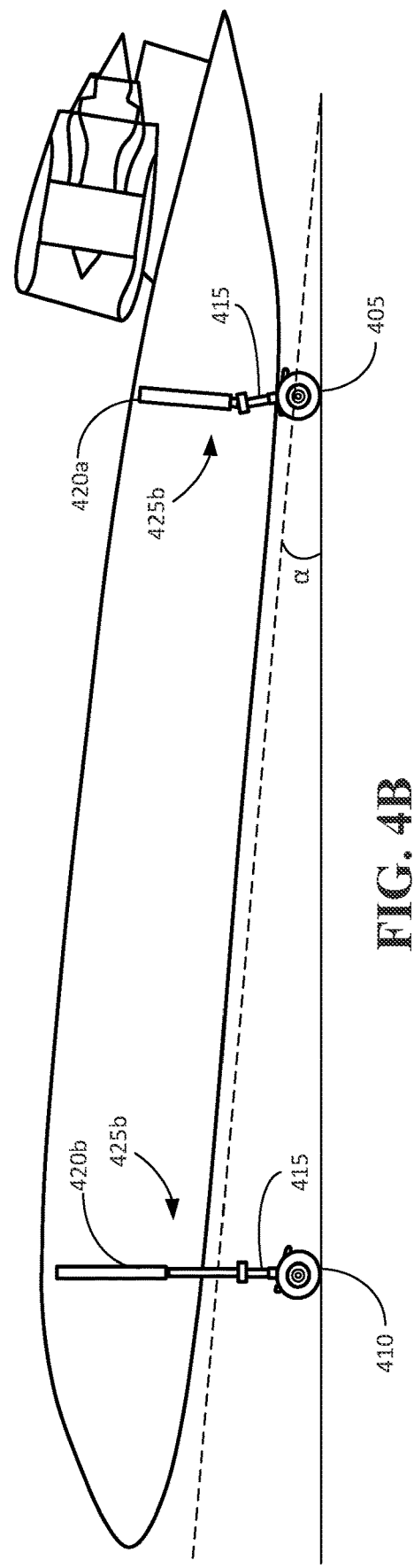
FIG. 4A
FIG. 4B

AIRCRAFT NOTIFICATION SYSTEM FOR A BLENDED WING BODY AIRCRAFT AND METHOD OF USE

FIELD OF THE INVENTION

The present invention generally relates to the field of aircraft. In particular, the present invention is directed to an aircraft notification system for a blended wing body aircraft.

BACKGROUND

An aircraft notification system is a system used to notify aircraft personnel of the status of one or more systems on aircraft. The notification system may be used to notify personnel on possible malfunctions or possible remedial actions that may be required. In instances where an aircraft may contain new systems, an updated notification system may be required in order to monitor the new systems. In addition, limitations may need to be put in place to ensure the accuracy of the updated notification systems.

SUMMARY OF THE DISCLOSURE

In an aspect, an aircraft notification system is described. The aircraft notification system includes a processor and a memory communicatively connected to the processor, the memory containing instructions configuring the processor to receive aircraft angle data from a blended wing body aircraft (BWB) having a main body and a wing with no clear demarcation between the wings and the main body along a leading edge of the aircraft, determine an aircraft orientation as a function of the aircraft angle data, wherein the aircraft orientation comprises at least a pitch angle of the BWB while the BWB is in contact with a ground surface, transmit the aircraft orientation to an aircraft display system and visually display the aircraft orientation through the aircraft display system.

In another aspect, a method of use for an aircraft notification system is described. The method includes receiving, by a processor, aircraft angle data from a blended wing body aircraft (BWB) having a main body and a wing with no clear demarcation between the wings and the main body along a leading edge of the aircraft, determining, by the processor, an aircraft orientation as a function of the aircraft angle data, wherein the aircraft orientation comprises at least a pitch angle of the BWB while the BWB is in contact with a ground surface, transmitting, by the processor, the aircraft orientation to an aircraft display system and visually displaying, by the processor, the aircraft orientation through an aircraft display system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A-4B are side views depicting a blended-wing aircraft with a direct hydraulic tilting landing gear system in the level, or ground position and in an angle of attack (AOA) position, in accordance with some examples of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for aircraft notification systems. "Aircraft notification system" for the purposes of this disclosure is a system used to notify an individual of the status of one or more systems on an aircraft. For example, and without limitation, aircraft notification system may make one or more determinations about the orientation of an aircraft and notify an individual about the orientation of the aircraft. In another non limiting example, aircraft notification system may notify individuals about components such as engines, landing gear and the like. In an embodiment, the present disclosure includes one or more input devices configured to determine the orientation of an aircraft while it is situated on a ground surface. In an embodiment, the present disclosure may determine the orientation of the aircraft through one or more input devices such as but not limited to, proximity sensors, gyroscopic sensors, ultrasonic sensors, and the like.

Aspects of the present disclosure can be used to determine the orientation of an aircraft while the aircraft is situated on a ground surface in instances where an aircraft contains landing gear that may be varied in length. Aspects of the present disclosure allow for aircraft personnel such as pilots to be notified about the orientation of the aircraft and possible issues that may be associated with the orientation. Aspects of the present disclosure allow for aircraft personnel to monitor additional systems on an aircraft.

Figure 1:
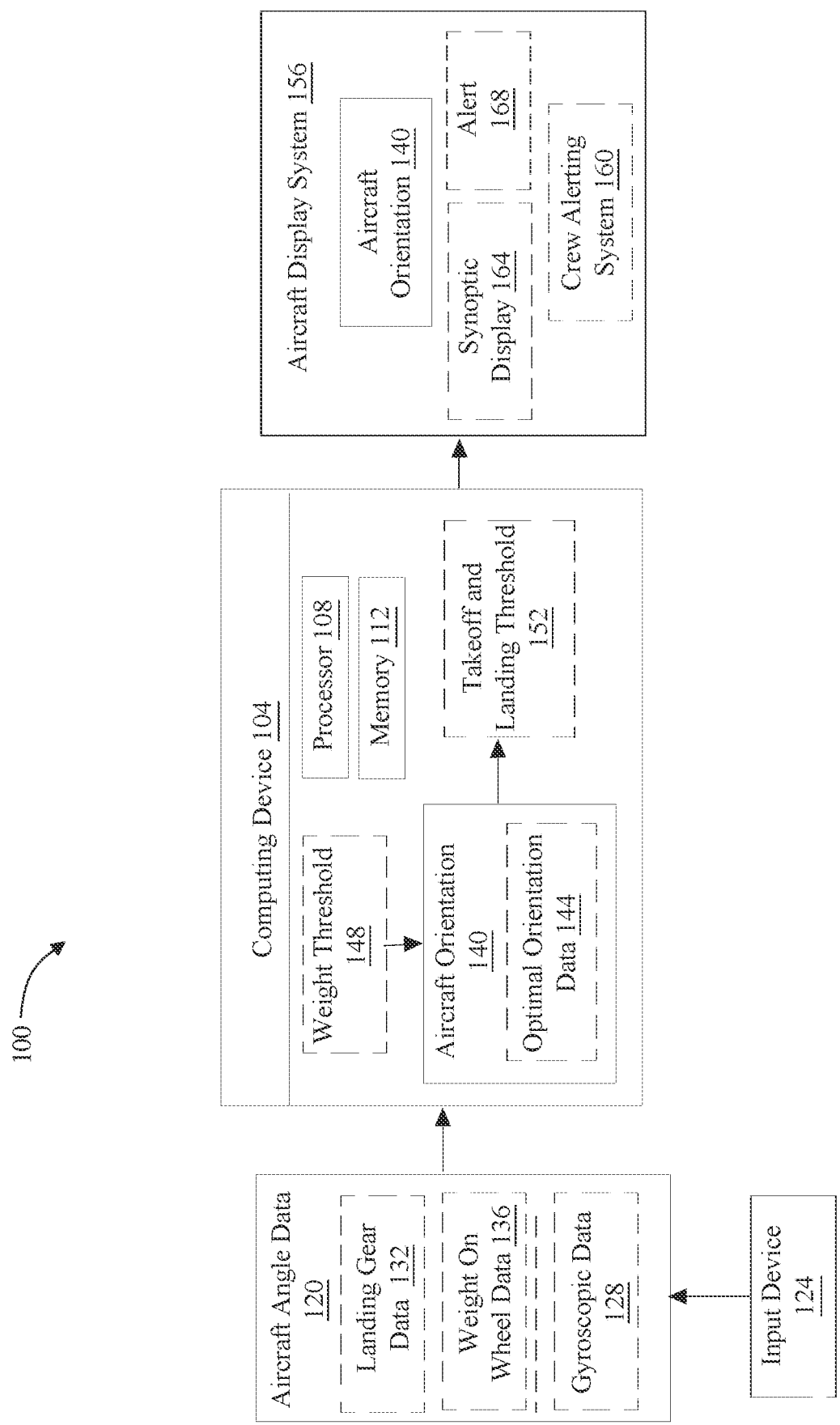
FIG. 1 is a block diagram of an exemplary embodiment aircraft notification system in accordance with the subject disclosure.

Referring now to FIG. 1, an aircraft notification system 100 is described. Aircraft notification system 100 includes a computing device 104. In one or more embodiments, computing device 104 may be consistent with a flight controller such as any flight controller as described in this disclosure. Aircraft notification system 100 includes a processor 108. Processor 108 may include, without limitation, any processor 108 described in this disclosure. Processor 108 may be included in a and/or consistent with computing device 104. In one or more embodiments, processor 108 may be consistent with a processing unit. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, aircraft notification system 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 108 may be configured to receive aircraft angle data 120. "Aircraft angle data" for the purposes of this disclosure is information that may be used to make one or determinations about the orientation of an aircraft about a pitch axis while the aircraft is still in contact with the ground. For example and without limitation, aircraft angle data 120 may include information received from one or more gyroscopic sensors wherein the gyroscopic sensors may indicate the rotation and/or angle of the aircraft in comparison to the ground. In one or more embodiments, an aircraft associated with aircraft notification system 100 may change in orientation about a pitch axis while still in contact with the ground. For example, and without limitation, the aircraft may have landing gear with varying extended lengths wherein a front landing gear having a differing extended length in comparison to an aft landing gear may cause the aircraft to orient about an angle.

While still in contact with the ground. In one or more embodiments, an aircraft in a stationary position may be leveled with a ground surface wherein the aircraft (or alternatively a point of reference on the aircraft) may be parallel to the ground surface. In one or more embodiments, in a non-stationary position the aircraft (or alternatively the same point of reference on the aircraft) may be oriented such that it is no longer parallel with the ground surface while still remaining in contact with the ground surface. In one or more embodiments, aircraft angle data may 120 include any data that may be used to determine the pitch angle of an aircraft while it is in contact with a ground surface.

With continued reference to FIG. 1, aircraft angle data 120 may include information such as but not limited, an orientation of an aircraft with respect to a point of reference of the aircraft and a ground surface. For example, and without limitation, aircraft angle data 120 may include '6 degrees', wherein the 6 degrees may indicate that the point of reference on the aircraft may be oriented 6 degrees in comparison to its stationary or base position. In one or more embodiments, aircraft angle data 120 may include a distance between point of reference of aircraft and a ground surface, wherein the distance may be used to determine the orientation of the aircraft. In one or more embodiments, in a stationary position, a point of reference of an aircraft may contain a specific distance to the ground surface whereas any differential in the distance may indicate the orientation of the aircraft has changed. In one or more embodiments, an orientation of an aircraft may include a height differential between two points of reference on an aircraft wherein the height differential may be used to determine an orientation of the aircraft. In one or more embodiments, aircraft angle data 120 may include a height, orientation, distance, height differential and the like of any point of references on an aircraft which may be used to determine the orientation of the aircraft.

With continued reference to FIG. 1, aircraft angle data 120 may be received through one or more input devices 124. "Input device" as described herein is any component that is capable of receiving, detecting, or measuring any physical properties of an aircraft. Input device 124 may include a computing device, a sensor, a plurality of sensors, a keyboard and the like. Input device 124 may refer to any input device 124 as described in this disclosure. Examples of an input device 124 include but are not limited to an audio input device 124 (e.g., a microphone, a voice response system, etc.), a video capture device (e.g., a still camera, a video camera), and any combinations thereof. Input device 124 may further comprise sensors, wherein the sensors are configured to receive angle orientation data. Input device 124 may include inertial sensors such as an accelerometer (e.g. measuring speed of aircraft), a gyroscope (e.g. measuring orientation or angular velocity of the aircraft), inertial measurement units (IMUs) and the like. Input device 124 may further include sensors such as optical sensors, photonic sensors, gyroscopic sensors, proximity sensors, accelerometers, humidity sensors, temperature sensors, magnetometers, ultrasonic sensors and the like. Input device 124 may further contain any sensor or component capable of receiving, detecting, or measuring data relating to the orientation, speed, and/or altitude of an aircraft. In some embodiments input device 124 may include a sensor configured to track or detect pilot controls. "Pilot controls" as described herein are aircraft components that allow a pilot to fly or maneuver an aircraft. Pilot controls may include a yoke, a level, switches, knob, flight controls, avionics and the like. Input device 124 may be used to detect pilot controls wherein input device 124 may receive pilot data. Pilot data may be used by a computing device 104 as described in this disclosure to make determinations about aircraft angle data 120. In some embodiments, input device 124 may include a video capture device. A "video capture device" as described herein is a device capable of recording audio, video, or both. Input device 124 may include any video capture device capable of recording audio-visual data. In some embodiments, input device 124 may include a camera. Input device 124 may be configured to transmit data to a computing device 104. Input device 124 may be interfaced to bus via any of a variety of interfaces (not shown) including, but not limited to, a serial interface, a parallel interface, a game port, a USB interface, a FIREWIRE interface, a direct interface to bus, and any combinations thereof. In some embodiments input device 124 may be configured to receive data. Input device 124 may receive image data wherein image data is data produced by scanning a surface or area with an optical or electronic device. Input device 124 may further contain video data wherein video data is any recordable form of audio-visual information. Input device 124 may further contain sensor data correlating to any sensor that may be utilized with input device 124.

With continued reference to FIG. 1, processor 108 is configured to receive aircraft angle data 120 from a blended wing body aircraft. A blended wing body aircraft (BWB) is an aircraft having a main body and a wing with no clear demarcation between the wings and the main body along a leading edge of the aircraft. BWB may be described in further detail below such as in reference to at least FIG. 3. In one or more embodiments, BWB aircraft may include one or more input devices 124 wherein processor 108 may be configured to receive aircraft angle data 120. In one or more embodiments, BWB aircraft may include a landing gear system, the landing gear system having a nose gear disposed proximate a front of the aircraft, the nose gear controllably movable between a first position and/or at an upper limit in which the nose gear is retracted, and a second position in which the nose gear is extended and/or at a lower limit. "Retracted" for the purposes of this disclosure refers to a positioning of one or more components of the landing gear system, wherein the components are not extended to their maximum capable length. In a non-limiting example, a component may be retracted wherein the component may extend outside of the outer mold line but only a portion of its maximum capable length. Continuing, the component may be retracted when the component only extended half of its capable length. In a first position, nose gear may be retracted or stowed away within blended wing body and/or a main body of the BWB. Nose gear may include a hinge, a swingarm, or any folding mechanism that may fold nose gear to store away into BWB and/or main body. In second position, nose gear may extend at or past a ground surface. "Extended" for the purposes of this disclosure is a positioning of one or more landing gear components outside of the outer mold line wherein the components extend at least a portion of their maximum length. For example, a landing gear system may be extended wherein a component may extend a portion or the entirety of the maximum capable length. In one or more embodiments, a landing gear system may be extended and/or situated at an upper limit and a lower limit wherein the upper limit denotes the minimum length at which the landing gear may extend outside of the BWB body and still remain functional for use, while the lower limit may denote the maximum length at which the landing gear system may be extended. In one or more embodiments, an upper limit may indicate a landing gear that is extended outside of BWB; however the landing gear is extended as minimal as possible while still allowing for use of the landing gear for during takeoff and landing. In one or more embodiments, a lower limit may indicate the maximum allowable extension of the landing gear system wherein the landing gear system is extended its maximum allowable length. Landing gear system may further include a main gear disposed proximate a rear of the aircraft, the main gear controllably movable between a third position, in which the main gear is extended and/or at a lower limit, and a fourth position, in which the main gear is retracted and/or at an upper limit, wherein, in a ground position, the nose gear is in the first position and main gear is in the third position and a fuselage of the aircraft is substantially level with the ground. In a third position, main gear may be extended at the same length as nose gear. In some embodiments, third position includes a position wherein main gear is extended at or below ground surface relative to nose gear. In a fourth position main gear may be retracted wherein main gear is not fully extended. This may include main gear being partially extended wherein main gear is at or below ground surface. In an angle-of-attack (AOA) position, the nose gear is in the second position and the main gear is in the fourth position and the fuselage of the aircraft is rotated to a positive AOA with respect to the ground. In one or more embodiments, in a high lift position, the nose gear is in the second position and the main gear is in the fourth position and the fuselage of the BWB is rotated to a positive deck angle with respect to the ground. In one or more embodiments, in a high lift position, the flaps and slats of an aircraft are extended to allow for lift of the aircraft. In one or more embodiments, a high lift position may indicate a configuration of various components of an aircraft that will allow for flight and/or takeoff of the aircraft. "Deck angle" for the purposes of this disclosure is an angle between a passenger deck (or an arbitrary fuselage reference plane) and a ground or water level surface. In one or more embodiments, a positive deck angle refers to an angle of an aircraft wherein the nose of the aircraft may be situated above a tail of the aircraft with respect to a ground surface. In one or more embodiments, an aircraft during takeoff may contain a positive deck angle. In one or more embodiments, in a high lift position, BWB may contain a positive deck angle due to the configuration of the landing gear. In some embodiments, BWB may contain landing gear system configured to shorten required takeoff field length and/or landing field length. In some cases, BWB may be configured to land in areas that have a maximum takeoff field length of 8,340 ft and a required landing field length of 4,400 ft. In some embodiments, a required takeoff field length may be 8,340 ft or less. In some embodiments, required landing field length may be 4,400 ft, or less. For the purposes of this disclosure, a "landing field length" is the length of a runway on which an aircraft is to land. For the purposes of this disclosure, a "required landing field length," is the length of the shortest runway on which an aircraft is configured to land. For the purposes of this disclosure, a "takeoff field length" is the length of a runway on which an aircraft is to takeoff. For the purposes of this disclosure a "required takeoff field length" is the length of the shortest runway on which an aircraft is configured to be able to safely takeoff from. In one or more embodiments, the landing gear system may include a nose gear disposed proximate a front of the aircraft, the nose gear controllably movable between a first position in which the nose gear is retracted, and a second position in which the nose gear is extended and a main gear disposed proximate a rear of the aircraft, the main gear controllably movable between a third position, in which the main gear is extended, and a fourth position, in which the main gear is retracted. In one or more embodiments, in a ground position, the nose gear may be in the first position and main gear may be in the third position and a fuselage of the aircraft may be substantially level with the ground. In one or more embodiments, in an angle-of-attack (AOA) position, the nose gear may be in the second position and the main gear may be in the fourth position and the fuselage of the aircraft is rotated to a positive AOA with respect to the ground. In one or more embodiments, in a first position nose gear may be retracted wherein nose gear is retracted and located within the outer mold line of BWB. Additionally or alternatively, in a second position nose gear may be extended wherein nose gear may be located outside the outer mold line. Landing gear system is described in further detail in reference to FIG. 4A-4B. Additional disclosure on landing gear systems may further be found in U.S. patent application Ser. No. 15/198,611, filed on Jun. 30, 2016, and titled "TILTING LANDING GEAR SYSTEMS AND METHODS," the entirety of which is incorporated by reference. Additional disclosure on landing gear systems may further be found in U.S. patent application Ser. No. 17/870,365, filed on Jul. 21, 2022, and titled "NON-COUPLED LANDING GEAR AIRCRAFT NOTIFICATION SYSTEM 100 AND METHODS OF USE," the entirety of which is incorporated by reference. Additional disclosure on landing gear systems may further be found in U.S. patent application Ser. No. 16/730,108, filed on Dec. 30, 2019, and titled "SWING-ARM PIVOT PISTON LANDING GEAR SYSTEMS AND METHODS," the entirety of which is incorporated by reference. Additional disclosure on landing gear systems may further be found in U.S. patent application Ser. No. 16/730,754, filed on Dec. 30, 2019, and titled "TILTING LANDING GEAR SYSTEMS AND METHODS the entirety of which is incorporated by reference. Additional disclosure on landing gear systems may further be found in U.S. patent application Ser. No. 17/868,973, filed on Jul. 20, 2022, and titled "COUPLED LANDING GEAR AND METHODS OF USE," the entirety of which is incorporated by reference.

With continued reference to FIG. 1, aircraft angle data 120 may include gyroscopic data 128. "Gyroscopic data" for the purposes of this disclosure is information associated with the aircraft orientation 140 as indicated by one or more gyroscopic sensors located on the aircraft. In one or more embodiments, graphic data may include information retrieved from one or more gyroscopic sensors. In one or more embodiments, gyroscopic data 128 may include a plurality of gyroscopic information wherein gyroscopic data 128 may include the orientation of an aircraft or changes of the orientation of the aircraft over a given time. In one or more embodiments, aircraft angle data 120 may include landing gear data 132. "Landing gear data" for the purposes is information associated with the landing gear of an aircraft. In one or more embodiments, an aircraft may contain landing gear with differing extended lengths wherein the differential in the lengths may cause the aircraft to orient about an axis. In one or more embodiments, landing gear data 132 may include any information associated with the landing gear of an aircraft that may be used to eventually determine the orientation of the aircraft. For example, and without limitation, landing gear data 132 may include a length of the nose gear of BWB and a length of at least one main gear of the BWB wherein the difference in length may be used to determine the orientation of the aircraft. In one or more embodiments, an average length of two main gears may be used to determine a length. In one or more embodiments, the length of the gear may be given in reference to the lower surface of the outer mold line of the aircraft. For example, and without limitation, a landing gear extending 2 feet past the outer mold line of the aircraft may contain a distance of two feet. In one or more embodiments, landing gear data 132 may include information as to whether the landing gear is extended or retracted, whether binary or not. In one or more embodiments, landing gear data 132 may include information indicating if the landing gear is stowed away. In one or more embodiments landing gear data 132 may include information associated with actuators, hydraulic systems, electric motors, and/or any other information that may be used to determine the length of the landing gear of an aircraft. In one or more embodiments, the amount of pressure, electricity and the like applied to extend or retract a landing gear system may be used to determine the distance at which the landing gear system may be positioned from the outer mold line of an aircraft. In one or more embodiments, the aircraft may contain one or more sensors and/or input devices 124 as described above in order to determine the distance of the landing gear from the aircraft. In one or more embodiments, an aircraft may contain input devices 124 such as but not limited to proximity switches, limit switches and the like to determine a position of the landing gear of the aircraft. In one or more embodiments, the landing gear of an aircraft may utilize hydraulic systems to extend and/or retract from the outer mold line wherein the aircraft may contain one or more sensors and/or input devices 124 to determine the distance of the landing gear systems. In one or more embodiments, an aircraft may include encoders to measure the rotation of the landing gear of the aircraft wherein the rotation may be correlated to its extended length. In one or more embodiments, the pressure of the hydraulic fluid, the flow rate of the fluid, the pressure pump rate and the like may be used to determine the particular orientation of the landing gear and the correlated extended length. In one or more embodiments, proximity switches may be sued to determine the distance of a predetermine located on the aircraft to a predetermined location on the landing gear wherein the distance may be correlated to the extended length of each landing gear. In one or more embodiments, limit switches may indicate if a landing gear has been fully retracted wherein a retracted landing gear may engage or disengage the limit switch.

With continued reference to FIG. 1, in one or more embodiments, a landing gear may include a linear actuating system wherein the landing gear may extend and retract. In one or more embodiments, the landing gear may first retract prior to being stowed away within the aircraft fuselage. In one or more embodiments, a landing gear may first rotate outside of the aircraft main body and then extend once the landing gear is situated outside of the main body. In one or more embodiments, in a first position landing gear may first rotate out of a fuselage of aircraft and in a second position landing gear may extend in length through its linear actuating system. In one or more embodiments, at different positions a differing datum may be required to measure the length of the aircraft landing gear. For example, in a first position an encoder may be used to determine the length of the landing gear while the landing gear is rotating. In a second position, once the landing gear has finished rotating, a second input device such as a proximity device or a pressure sensor may be used to determine the extended length of the landing gear. In one or more embodiments, landing gear data may include an aggregate of multiple different datums wherein the aggregate of datums may be used to determine the overall landing gear length. In one or more embodiments, differing input devices may be required to measure the length of the landing gear at differing points of extension of the landing gear. In one or more embodiments, input devices may include encoders, proximity sensors, pressure sensors, ultra sonic sensors and the like wherein each input device may be used separately or in conjunction with another input device during extension of the aircraft landing gear.

With continued reference to FIG. 1, in one or more embodiments, processor 108 may be configured to determine the orientation of an aircraft and/or receive aircraft angle data 120 only upon the occurrence of an event. In one or more embodiments, the event may include an instance in which landing gear may not be fully stowed away within aircraft. In one or more embodiments, a limit switch, proximity sensors, pressure sensor and/or any other input devices as described in this disclosure may be used to monitor the position of one or more landing gears. In one or more embodiments, one or more landing gear may be situated in a stowed position during a flight wherein during a stowed position, processor may be configured not to receive aircraft angle data. In one or more embodiments, an input device may be used to detect movement of the landing gear wherein processor may be configured to receive aircraft angle data once the landing gear has moved from the stowed position. In one or more embodiments, processor may be configured to receive gyroscopic data 128 in a stowed position. In one or more embodiments, in a stowed position, data received may be inaccurate or unnecessary. For example, in a stowed position, the length of the landing gear will not change until the landing gear has been moved from the stowed position. In one or more embodiments, processor may receive aircraft angle data 120 following movement of the landing gear.

With continued reference to FIG. 1, in one or more embodiments, aircraft angle data 120 may include aircraft velocity. "Aircraft velocity" for the purposes of this disclosure is an indication of the speed of the aircraft. In one or more embodiments, an aircraft may contain an airspeed indicator wherein aircraft angle data 120 may receive aircraft velocity from the airspeed indicator. In one or more embodiments, aircraft velocity may be received through one or more global positioning sensors (GPS). In one or more embodiments, aircraft velocity may be received from an inertial navigation system on aircraft. In one or more embodiments, an aircraft may contain a pitot tube used to determine the velocity of the aircraft wherein aircraft velocity may be received from the pitot tube. In one or more embodiments, aircraft velocity may be received from one or more sensors and/or input devices 124 located on an aircraft configured to determine a speed for the aircraft. In one or more embodiments, aircraft angle data may contain aircraft velocity wherein computing device 104 may determine the orientation of the aircraft relative to its speed. In one or more embodiments, an aircraft may require differing orientations based on its proximal speed. In one or more embodiments, aircraft velocity may include an indicated airspeed. "Indicated airspeed" for the purposes of this disclosure is a speed of an aircraft as measured by the dynamic pressure of outside air entering a pitot tube. In one or more embodiments, indicated airspeed may be equivalent to dynamic pressure. In one or more embodiments, dynamic pressure may be calculated as ½ *rho*V2 where, in American units, rho is air density in slugs per cubic foot and V is true airspeed in ft/sec. Expanding further, air density may depend on a combination of air pressure (altitude) and temperature. In one or more embodiments, indicated airspeed and/or true air speed may account for wind, altitude and/or temperature which may affect lift. In one or more embodiments, aircraft velocity may further include a maximum crosswind component. "Crosswind component" for the purposes of this disclosure is a vector component of a wind vector that is perpendicular to a runway axis. For example and without limitation, a wind blowing at 20 knots from an angle of 30° to the runway has a crosswind component perpendicular to the runway of) Sin (30° *20 knots=10 knots. It is this 10-knot component that may be used to calculate the aerodynamic yaw angle of the airplane as it accelerates along the runway. Certified airplanes may specify a maximum crosswind component for safe operation. "Maximum crosswind component" for the purposes of this disclosure is the maximum cross windspeed in which an aircraft can safely takeoff. This may influence takeoff behavior and may be a part of the overall system. maximum crosswind component may be a certain value that may be broken into a longitudinal component and crosswind (lateral) component using straightforward trigonometry. A key factor is that an aircraft may be approximately constrained to roll straight down the runway. A crosswind component may result in an aerodynamic yaw angle that may, for example, unfavorably reduce takeoff performance and, for example, may require a greater takeoff rotation angle.

With continued reference to FIG. 1, aircraft angle data 120 may include weight on Wheel (WoW) data. "Weight on wheel data," for the purposes of this disclosure, is information indicating if a force is applied to the wheels of one or more landing gear systems. In one or more embodiments, weight on wheel data 136 may be used to determine if an aircraft is situated on the ground or if it is airborne. In one or more embodiments, weight on wheel data 136 may be used to indicate which landing gear system is still situated on the ground and which are airborne. For example, and without limitation, during a takeoff, a nose gear may be situated off the ground while the main gear may be in contact with the ground. In one or more embodiments, weight on wheel data 136 may be received from proximity sensors located on the aircraft wherein an increase in distance between a ground surface and the aircraft may indicate that a portion of aircraft may be situated in the air. In one or more embodiments, weight on wheel data 136 may be received from one or more mechanical switches that may be used to determine if a wheel or a landing gear is in contact with a ground surface. In one or more embodiments, weight on wheel data 136 may be received from one or more pressure sensors located on each landing gear system wherein the presence of pressure and/or pressure past a specific threshold may indicate that the aircraft is still in contact with the ground. In one or more embodiments, weight on wheel data 136 may be received from one or more strain gauges, load cells, proximity sensors and/or any other sensors that may be used to indicate that a landing gear system is still in contact with a ground surface. In one or more embodiments, weight on wheel data 136 may be used to determine if a load is being applied to the landing gear system and the magnitude of the load. In one or more embodiments, data within weight on wheel data 136 may be used to determine an aircraft orientation 140 wherein a load differential between two landing gear systems may indicate that a center of gravity of an aircraft has shifted due to the aircraft orientation 140. In one or more embodiments, in instances where a first landing gear is extended further than a second landing gear, a center of gravity may shift away from the first landing gear.

With continued reference to FIG. 1, aircraft notification system 100 may contain a plurality of redundant sensors and/or input devices 124 configured to receive the same or similar data. For example, and without limitation, more than one input device 124 may be used to determine aircraft velocity. In one or more embodiments, the redundant sensors and/or input device 124 may include similar input device 124, such as for example, two similar proximity sensors. Additionally or alternatively, the redundant input devices 124 may include two differing input device 124. For example, and without limitation, a first input device 124 may be configured to receive weight on wheel data 136 using one or more proximity sensors wherein a second input device 124 may be configured to receive weight on wheel data 136 using one or more pressure sensors. In one or more embodiments, redundant input devices 124 may allow for failure detection and/or error correction wherein two similar input devices 124 having differing data may indicate that one of the input devices 124 may be incorrect. In one or more embodiments, redundancy may allow for increased safety and reliability wherein alternative input devices 124 may be used in instances where a first input device 124 may not be working correctly.

With continued reference to FIG. 1, processor 108 is configured to determine aircraft orientation 140 as a function of aircraft angle data 120. "Aircraft orientation," for the purposes of this disclosure, is information associated with at least the orientation of an aircraft. For example, and without limitation, aircraft orientation 140 may contain information indicating that the aircraft is oriented +12 degrees in comparison to a reference point or in comparison to a ground surface. In one or more embodiments, a positive degree angle may indicate an increase in height between a nose of the aircraft and the ground surface in comparison to a base length. In one or more embodiments, a negative degree angle may indicate a decrease in length between the nose of the aircraft and a ground surface in comparison to a base length. In one or more embodiments, aircraft orientation 140 may include a height differential wherein the eight differential may indicate a difference in vertical distance between one portion of the aircraft and another portion of the aircraft. For example, and without limitation, aircraft orientation 140 may include information indicating that a nose of the aircraft is elevated 1 foot above the main body or 1 foot higher in comparison to the main body wherein aircraft orientation 140 may indicate that a portion of the aircraft is slightly elevated. In one or more embodiments, aircraft orientation 140 may include the orientation of the BWB about a horizontal axis and/or a nominal horizontal axis while the BWB is in contact with a ground surface. In one or more embodiments, aircraft orientation 140 may include a pitch angle of BWB, wherein the pitch angle (sometimes referred to as the attitude) is the angle between the longitudinal axis (where the airplane is pointed) and the horizon. In one or more embodiments, aircraft orientation 140 may include a pitch angle while the aircraft is in contact with a ground surface. In one or more embodiments, aircraft orientation 140 may include an orientation about a nominal horizontal axis. In one or more embodiments, aircraft orientation 140 may include the orientation of the BWB above or below the horizontal axis wherein a BWB situated below the horizontal axis may be represented as a negative angle and a BWB situated above the horizontal axis may be represented as a positive angle. In one or more embodiments, aircraft orientation 140 may include information indicating the pitch angle of an aircraft while it is in contact with the ground.

In one more embodiments, aircraft orientation 140 may include data indicating that a portion of an aircraft is slightly elevated in comparison to the rest of the aircraft. In one or more embodiments, aircraft orientation 140 may indicate that a nose or a tail off the aircraft is elevated in comparison to a base. In one or more embodiments, aircraft orientation 140 may include the orientation of the aircraft while it is in contact with a ground surface. For example, in instances where landing gear is extended at differing lengths, an orientation of the aircraft may change based on the extension of the landing gear. In one or more embodiments, aircraft orientation 140 may include the orientation of the aircraft if the aircraft had been in contact with a ground surface. For example, and without limitation, an aircraft may contain a particular orientation with a ground surface due to the extension of its landing gear if the aircraft had not been airborne. Continuing, when an aircraft is airborne, the aircraft may be situated at a particular orientation based on the orientations of the wings of the aircraft. As a result, the extension of the landing gear may not have an effect on the orientation of the aircraft until the aircraft is situated on the ground. In one or more embodiments, aircraft orientation 140 may be associated with the extension of the aircraft landing gear wherein the orientation of the landing gear is representative of the extension of the landing gear. In one or more embodiments, processor 108 may use an Algorithmic logic unit (ALU) to determine aircraft orientation 140 in terms of angle or height differential. In one or more embodiments, processor 108 may determine aircraft orientation 140 through receipt of gyroscopic data 128. In one or more embodiments, aircraft orientation 140 may be generated as a function of landing gear data 132 wherein processor 108 may determine an angle or height based on a height differential between a length of the main gear and a length of the nose gear. In one or more embodiments, processor 108 may use one or more trigonometric equations to determine aircraft orientation 140. In one or more embodiments, aircraft orientation 140 data may include ground data wherein ground data includes an indicating if the aircraft is contact with the ground. In one or more embodiments, processor 108 may be configured to compare the weight on wheel data 136 to a weight threshold 148 wherein weight on wheel data 136 exceeding a weight threshold 148 may indicate that the aircraft is still in contact with the ground. In one or more embodiments, weight threshold 148 may include a predetermined pressure, compressive force, force, a predetermined distance and the like wherein exceeding the predetermined amount may indicate that a force is being applied to the landing gear of the aircraft or that the aircraft is situated further from the ground, and as a result the aircraft is still in contact with the ground. In one or more embodiments, weight on wheel data 136 may include information for each landing gear wherein processor 108 may determine. Whether each landing gear is in contact with the ground surface. In one or more embodiments, ground data may be binary wherein ground data may indicate if the aircraft is or isn't in contact with the ground surface. In one or more embodiments, ground data may indicate if each landing gear is in contact with the ground. In one or more embodiments, determining aircraft orientation 140 may include comparing the weight on wheel data 136 to a weight threshold 148. In one or more embodiments, processor 108 may first determine if an aircraft is in contact with the ground prior to determining aircraft orientation 140. In one or more embodiments, in instances where the aircraft is situated off the ground, aircraft orientation 140 may indicate that the aircraft is situated off the ground. In one or more embodiments, aircraft orientation 140 may only indicate the orientation of the aircraft when it is in contact with the ground surface. In one or more embodiments, aircraft orientation 140 data may indicate the orientation of the aircraft while it is in contact with a ground surface and during flight. In one or more embodiments, a maximum orientation may occur when a first gear is fully extended, and a second landing gear is restricted to the minimum allowable length. For example, and without limitations, a first landing gear may contain a maximum extended distance of 6 feet, whereas a second landing gear may contain a minimum extended distance while in contact with the ground at 2 feet. As a result a maximum aircraft orientation 140 may be 4 feet, or an angle associated with four feet. Assuming, as a non-illustrative example, that the distance between the main gear and the nose gear is 40 feet. The angle associated with 4 feet may be 5.73 degrees. In one or more embodiments, processor 108 may determine that an aircraft is currently airborne if aircraft orientation 140 exceeds the maximum orientation.

With continued reference to FIG. 1, processor 108 may be configured to determine aircraft orientation using a lookup table (as described below). In one or more embodiments, pressure, fluid rate, orientation of landing gear, forces and the like as described within aircraft angle data 120 may be correlated to various aircraft orientation 140. In one or more embodiments, processor 108 may use one or more linear equations to determine aircraft orientation 140 wherein each unit of measurement may be associated with a particular linear equation. For example, and without limitation, a particular linear equation may be used to convert pressure associated with landing gear into aircraft orientation. Counting, the particular pressure may be associated with a particular extension length of the landing gear wherein the extension length may then be used to determine aircraft orientation. In one or more embodiments, multiple differing units of measurement may be used to determine aircraft orientation 140. For example, and without limitation, an encoder may indicate a particular rotation angle of the landing gear and a proximity sensors or pressure sensor may be used to determine the length of the landing gear system after it has extended in length. In one or more embodiments, processor 108 may use multiple linear equations and/or lookup tables and aggregate values to determine an overall aircraft orientation. In one or more embodiments, processor 108 may determine if the aircraft is situated on the ground prior to determining aircraft orientation. For example, and without limitation, processor may receive data that may be dispositive of whether the aircraft is in contact with a ground surface prior to determining aircraft orientation 140. In one or more embodiments, in instances where weight on wheel data indicates the aircraft is not in contact with the ground, aircraft orientation may be zero, null or may indicate the orientation of the aircraft while flying. In one or more embodiments, in instances where weight on wheel data indicates that the aircraft is situated on the ground then aircraft orientation may be calculated in any way as described in this disclosure.

With continued reference to FIG. 1, processor 108 may be configured to compare landing gear data 132 to gyroscopic data 128. In one or more embodiments, Landing gear data 132 may only be accurate in instances where the aircraft is in contact with a ground surface. In one or more embodiments, an orientation calculated by landing gear data 132 and gyroscopic data 128 may be compared. In one or more embodiments, in instances wherein an orientation calculated by landing gear data 132 and/or gyroscopic data 128 are not aligned or within a similar range, then aircraft may be airborne or partially airborne. In one or more embodiments, a landing gear system may be partially extended during an airborne flight wherein an orientation calculated by landing gear data 132 may be inaccurate. In one or more embodiments, comparing landing gear data 132 to gyroscopic data 128 may allow for error detection wherein on a ground surface, if the an orientation by landing gear data 132 and an orientation by gyroscopic data 128 are not similar, them there may be an indication that a system is faulty. In one or more embodiments, processor 108 may be configured to compare landing gear data 132 to gyroscopic data 128 wherein a difference between an orientation calculated by gyroscope data and landing gear data 132 may indicate that the aircraft is airborne. In one or more embodiments, processor 108 may be configured to determine aircraft orientation 140 by determining if the aircraft is airborne or in contact with the ground. In instances where the aircraft is in contact with the ground, aircraft orientation 140 data may be calculated using either landing gear data 132 and/or gyroscopic data 128. In instances, where the aircraft is airborne, landing gear data 132 may be inaccurate and as a result, gyroscopic data 128 may be used to determine the actual orientation of the aircraft.

With continued reference to FIG. 1, aircraft orientation 140 may include optimal orientation data 144. "Optimal orientation data" for the purposes of this disclosure is an optimal orientation of the aircraft while it is still in contact with a ground surface. For example, and without limitation, optimal orientation data 144 may indicate that the main gear of the aircraft should be extended a particular distance, the orientation of the aircraft should be at a specific angle, a point of reference of the aircraft should contain a particular height differential and the like. In one or more embodiments, during take off and landing an aircraft may require varying orientations to optimize takeoff and landing distances and/or increase efficiency. In one or more embodiments, at varying speeds, the aircraft may require a differing orientation to ensure optimal take-off and landing. In one or more embodiments, processor 108 may receive the speed of the aircraft from aircraft velocity and determine optimal orientation data 144. In one or more embodiments, processor 108 may determine that a particular orientation is optimal during takeoff in order to provide for increased aerodynamic efficiency and decreased takeoff length. In one or more embodiments, processor 108 may determine that a particular orientation during landing may provide for decreased landing distance. In one or more embodiments, processor 108 may determine if an aircraft is taking off or landing using one or more input devices 124 as described in this disclosure and provide optimal orientation data 144. In one or more embodiments, processor 108 may use a lookup table to determine optimal orientation data 144 wherein each range of speeds may be correlated to a particular orientation of the aircraft. "Lookup table" as described herein is an array that holds a set of values wherein a specific key returns a specific value. As a non-limiting example, lookup table may contain input values such as the speed of an aircraft and output values such as the optimal orientation of the aircraft. In one or more embodiments, the lookup table may further include values associated with takeoff and/or landing wherein during takeoff an optimal orientation of the aircraft may differ for the same speeds or range of speeds in comparison to the landing of the aircraft. In one or more embodiments, processor 108 may determine optimal orientation data 144 in real time wherein optimal orientation data 144 may differ based on the current speed of the aircraft. Similarly, processor 108 may determine aircraft orientation 140 in real time wherein aircraft orientation 140 may differ based on the speed of the aircraft.

With continued reference to FIG. 1, processor 108 may be configured to compare aircraft orientation 140 to one or more takeoff and landing thresholds 152. "Takeoff and landing threshold" for the purposes of this disclosure is a predetermined limit regarding the movement of one or more systems on aircraft. For example, and without limitation, takeoff and landing threshold 152 may include a maximum speed while an aircraft is still on the ground. In one or more embodiments, takeoff and landing thresholds 152 may include but are not limited to, a maximum aircraft orientation 140 while the aircraft is on the ground, a minimum or maximum aircraft orientation 140 for an aircraft at a given speed, a minimum extended distance of a specific landing gear, a maximum allowable thrust for a given aircraft orientation 140 and the like, a maximum allowable time in which landing gear may be extended following take off, a maximum aircraft orientation 140 while the aircraft is still in contact with and/or partially in contact with the ground, and the like. In one or more embodiments, takeoff and landing thresholds 152 may be used to prevent damage to an aircraft or to prevent harm to one or more passengers on the aircraft. In one or more embodiments, takeoff and landing thresholds 152 may be used to determine the aerodynamic efficiency of the aircraft at a given instances wherein exceeding the threshold may indicate that the aerodynamic efficiency of the aircraft has not been maximized. In one or more embodiments, an aircraft may have a maximum aircraft orientation 140 during takeoff wherein exceeding the aircraft orientation 140 may cause harm to the aircraft or the people inside. In one or more embodiments, an aircraft having a larger surface area such as a blended wing body may be more prone to strong winds wherein the surface area of the BWB may be less resistant to the winds. In one or more embodiments, aircraft orientation 140 may contain a maximum orientation during flight wherein exceeding the orientation may cause harm to the aircraft.

With continued reference to FIG. 1, processor 108 may be configured to transmit aircraft orientation 140 to an aircraft display system 156. "Aircraft display system," for the purposes of this disclosure, is a system, including a display, used to notify aircraft personnel of the status of various aircraft systems. In one or more embodiments, aircraft display system 156 may visually display the status of one or more engines within the aircraft. In one or more embodiments, aircraft display system 156 may include a display device configured to display the speed of the aircraft, the elevation of the aircraft, various orientations about a pitch axis, yaw axis and/or a roll axis, horizontal axis, vertical axis and the like. In one or more embodiments, aircraft display system 156 may provide an individual such as a pilot with updates about various systems on the aircraft such as the engines of the aircraft. In one or more embodiments, aircraft display system 156 may be communicatively connected to one or more computing devices 104 and/or input devices 124 and configured to receive information associated with one or more systems on the aircraft. In one or more embodiments, aircraft display system 156 may include a crew altering system 160 (CAS) or an engine indicating and crew alerting system (EICAS). "Crew alerting system" for the purposes of this disclosure is system used to provide aircraft personnel with information associated with the status of one or more aircraft systems. In one or more embodiments, CAS may include a display device with information associated with the status of one or more aircraft systems. In one or more embodiments, CAS may include announcements as to the status of one or more aircraft systems. In one or more embodiments, CAS 160 may provide aircraft personnel with the requisite information to make determinations about the status of the aircraft. In one or more embodiments, CAS 160 may include visual depiction of various systems on the aircraft wherein the visual depictions may allow for aircraft personnel to quickly understand the status of one or more systems on an aircraft. For example, and without limitations, visual depictions may include an engine outline, wherein a red outline of the engine may indicate an issue with the engine and a green outline may indicate that there are no issues with the engine. In one or more embodiments, the crew alerting system may be used to notify aircraft personnel of any relevant information necessary during a flight. In one or more embodiments, aircraft display system 156 may be configured to display information associated with aircraft orientation 140. In one or more embodiments, processor 108 may transmit aircraft orientation 140 to aircraft display system 156. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others.

In one or more embodiments, processor 108 may be configured to create a user interface data structure. As used in this disclosure, "user interface data structure" is a data structure representing a specialized formatting of data on a computer configured such that the information can be effectively presented for a user interface. User interface data structure may include aircraft orientation 140, the comparison of aircraft orientation 140 to one or more take off and landing thresholds and the like.

With continued reference to FIG. 1, in one or more embodiments, processor 108 is configured to visually display aircraft orientation 140 through aircraft display system 156. In one or more embodiments, processor 108 may visually display aircraft orientation 140 through a user interface. In one or more embodiments, aircraft display system 156 may include a user interface. For the purposes of this disclosure, a "user interface" is a means by which a user and a computer system interact. For example, through the use of input devices 124 and software. In some cases, processor 108 may be configured to modify a graphical user interface as a function of the data described above by populating user interface data structure and visually presenting the data though the graphical user interface. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI may contain an interaction component. "Interaction component" for the purposes of this disclosure is a device or a computer program that is capable of allowing a user to interact with GUI. Interaction component may include a button or similar clickable elements wherein the clicking of the button may initiate a response or a command. In some cases, interaction component may allow a user to select elements on aircraft notification system 100 such as a visual depiction of the aircraft orientation 140 wherein interaction component may allow for a pop up to appear to display information associated with aircraft orientation 140. For example, aircraft notification system 100 may include a visual depiction indicating that there is an issue with aircraft orientation 140 wherein selection of the visual depiction may allow an individual to view additional information associated with the issue. In some embodiments, interaction component may include an event handler. In some cases, event handler may include routine, wherein the routine is a sequence of code that is intended to be called and executed repeatedly when component configuration interface module is running. In a non-limiting example, event handler may include a call back routine, wherein the callback routine may dictate one or more action that follows event. In some cases, event may include a plurality of actions. In other cases, event may involve other interactive devices such as, without limitation, mouse, keyboard, display, headphone, any other interactive device that is either electrically and/or communicatively connected to computing device 104, and the like thereof. In a non-limiting example, user may interact with interaction component through performing an event on GUI, wherein the event may include user clicking a checkbox present on the visual interface. In some embodiments, event handler may utilize one or more application program interface (API) such as, without limitation, web events and the like thereof. Additionally, or alternatively, event handler may operate any processing step described in this disclosure.

With continued reference to FIG. 1, processor 108 may be configured to generate a graphical view for aircraft display system 156. The graphical view may include at least a display element generated as a function of aircraft orientation 140. A "display element," as used in this disclosure, is an image that a program and/or data structure may cause to be displayed on a display of a device such as display device. Display elements may include, without limitation, windows, pop-up boxes, web browser pages, display layers, and/or any other display element that may occur to a person skilled in the art upon reviewing the entirety of this disclosure. Graphical view includes a first selectable graphic corresponding to a first selectable event handler. A "selectable graphic," as used in this disclosure, is a graphical element that upon selection using a cursor or other locator as manipulated using a locator device such as a mouse, touchscreen, track pad, joystick, or the like will trigger an action to be performed on aircraft notification system 100 and/or computing device 104. In some cases, the actions may include operation of one or more event handlers. In some cases, one or more routines may be executed by an event handler when a selectable graphic is pressed. As a non-limiting example, events and/or routines associated with a selectable graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may further include redirection to another step of the processing and/or other display windows within aircraft notification system 100. Redirection may be performed using any event handler, including without limitation event handlers detecting the click of a mouse or other locator, access of redirection link using a touchscreen, the selection of any key, mouseover events, or the like. First selectable graphic may be configured to trigger a first action if first selectable graphic is selected. First action may include instructions from processor 108 to select aircraft orientation 140 or a selectable graphic associated with aircraft orientation 140 and display information associated with aircraft orientation 140. In one or more embodiments, first action may include instruction to display a 'pop-up window' wherein the pop-up window may display information associated with aircraft orientation 140. In some cases, graphical view may include more than one selectable graphics wherein selection of each selectable graphic may trigger an action. In one or more embodiments selectable graphics may be associated with aircraft orientation 140 and/or other systems on an aircraft. In one or more embodiments, each monitored system on an aircraft may contain its own selectable graphic wherein selection for the selected graphic may display information associated with the monitored system. For example, selectable graphic may include a visual depiction of aircraft orientation 140, a visual depiction of an engine, a visual depiction of altitude and the like wherein selection of the visual depiction may present additional information associated with the system associated with the visual depiction.

With continued reference to FIG. 1, aircraft display system 156 may include a synoptic display 164. "Synoptic display," for the purposes of this disclosure, is a visualization of active systems on an aircraft that are selectable. For example, and without limitation, synoptic display 164 may include a visualization of an engine wherein selection of the engine may allow an individual to view information associated with the engine. In one or more embodiments, synoptic display 164 may allow an individual to view multiple systems associated with an aircraft on a single screen. In one or more embodiments, synoptic display 164 may include visualization for each system on an aircraft, such as but not limited to, landing gear systems, engines, throttles and the like. In one or more embodiments, each visualization may include an outline, or an image associated with the systems of the aircraft. For example, and without limitation, a visualization may include an outline of an aircraft engine wherein the outline may be associated with the aircraft engine. In one or more embodiments, visualization of each system may contain selectable graphics wherein selection of the selectable graphic may display associated with the aircraft system. For example, and without limitation, selection of an engine may show information associated with an engine such as but not limited to, temperatures, the status of various engine components and the like, in one or more embodiments, aircraft display system 156 may visually display images, selectable graphics, visualization and the like that depict the status of the orientation of the aircraft while it is in contact with the ground. In one or more embodiments, the visualization may change colors based on the status of one or more systems. For example, ins instances where the orientation of the aircraft is situated in an incorrect orientation, aircraft display system 156 may display aircraft orientation 140 in yellow or red to indicate to the pilot that some issues exist with aircraft orientation 140. In one or more embodiments, visualization on the synoptic display 164 may change colors wherein the changing of a color may indicate an issues with one or more systems. In on or more embodiments, aircraft display system 156 and/or synoptic display 164 may display visualization associated with a plurality of system wherein each visualization may contain a color indicating the status of the system. For example and without limitation, systems without issues may be displayed in a green colors, systems that could potentially have issues may be displayed in yellow and systems with issues may be displayed in red. In one or more embodiments, the visualizations may allow a pilot to view multiple systems in a single screen. In one or more embodiments, the visualizations may allow a pilot to be notified when a system malfunctions and which system that is currently malfunctioning. In one or more embodiments, synoptic display 164 may allow a pilot or aircraft personnel to select system individually in order to view information associated with the systems. In one or more embodiments, aircraft display system 156 may visually display aircraft orientation 140 by displaying an outline of a BWB aircraft. In one or more embodiments, the outline of the BWB may be oriented on aircraft display system 156 relative to the orientation of the aircraft to indicate to a pilot the relative orientation of aircraft. In one or more embodiments, visualization may further include the aircraft orientation 140 such as the angle of the aircraft or the height differential. In one or more embodiments, aircraft display system 156 may further include arrows and/or other visual guides that indicate the ideal aircraft orientation 140. In one or more embodiments, processor 108 may use optimal orientation data 144 to determine an optimal orientation of the aircraft. In one or more embodiments, aircraft display system 156 may include visual guides and/or arrows indicating the direction the aircraft may need to orient in order to achieve an ideal aircraft orientation 140 as indicated in optimal orientation data 144.

With continued reference to FIG. 1, aircraft display system 156 may further include a display device communicatively connected to at least a processor 108. "Display device" for the purposes of this disclosure, is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through GUI to a user, wherein a user may interact with the data through GUI. In some cases, a user may view GUI through display device.

With continued reference to FIG. 1, aircraft display system 156 may be configured to display an alert 168 upon the occurrence of a takeoff or landing event. "Alert" for the purposes of this disclosure is a notification that one or more aircraft systems require attention. For example, and without limitation, alert may include a notification that an aircraft engine is working properly. In another non limiting example, alert may include a notification that an aircraft system such as the orientation of the aircraft requires attention. In one or more embodiments, alert may include an audio alert such as a noise. In one or more embodiments, alert may include a visual notification such as a popup, a changing of a color and any other visualization that may indicate to aircraft personnel that an aircraft system requires attention. In one or more embodiments, alert may include a haptic alert wherein an aircraft personnel are notified through vibrations of one or more aircraft components. In one or more embodiments, alert may include an audio alert such as an alarm emitted through a speaker. In one or more embodiments, alert may include a visual alert such as flashing lights or visualization on a display device. In one or more embodiments, alert may include any alert that may capture the attention of aircraft personnel in order to notify the aircraft personnel or a system requiring attention. "Takeoff or landing event" for the purposes of this disclosure is an indication that one or more elements within aircraft orientation 140 data has exceeded one or more takeoff and landing thresholds 152. For example, and without limitation a takeoff or landing event may occur when an aircraft is traveling too quickly while still in contact with the ground. In one or more embodiments, a takeoff or landing event may occur wherein one or more elements within aircraft orientation 140 exceed one or more takeoff and landing thresholds 152. This may include but is not limited to, the orientation of the aircraft being too large, the orientation of the aircraft situated in the wrong direction, the orientation of the aircraft is too large or small for a given speed, the landing gear of the aircraft is still extended during a flight, the landing gear is extended too early prior to landing, the aircraft orientation 140, aircraft orientation 140 may be in accurate for a takeoff and/or landing procedure and the like. In one or more embodiments, aircraft display system 156 may be configured to display an alert 168 for each takeoff or landing event. In one or more embodiments, aircraft display system 156 may change a color of a visualization of aircraft orientation 140 wherein the change in color may indicate to a pilot to select the visualization on the synoptic display 164 to determine the particular issues. In one or more embodiments, alerts 168 may include popup windows or dedicated portions of a display that may display the threshold has been exceeded. For example, the alert 168 may indicate "Aircraft orientation 140 too large." In one or more embodiments, an alert 168 may include a visualization on aircraft display system 156 that an issue has occurred wherein a pilot may select the visualization to view the issue in more detail. In one or more embodiments, a visualization may include a flashing image wherein the flashing image may indicate that the particular system requires attention.

Figure 2A:
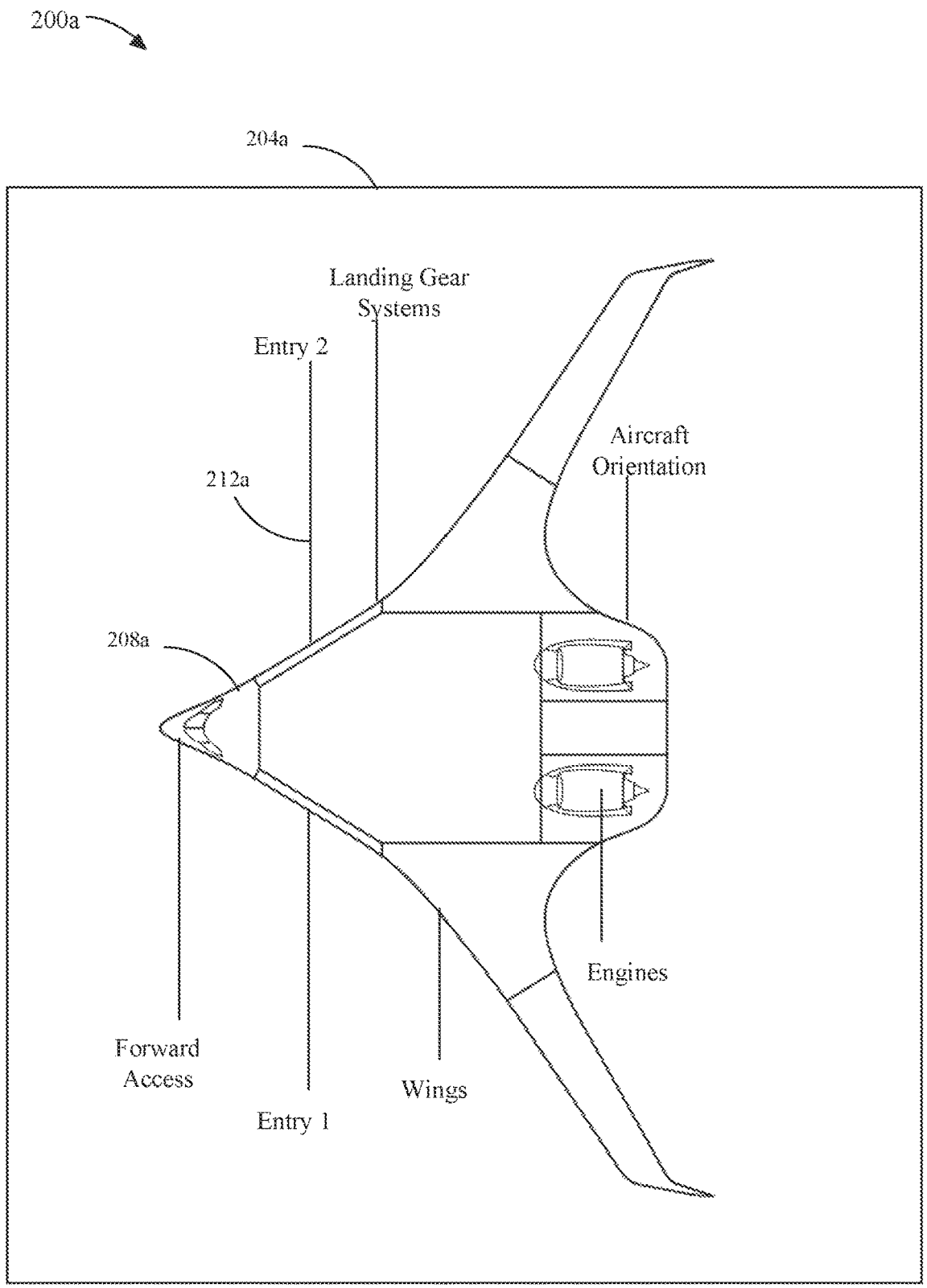
FIGS. 2A-2C are various illustrations of an aircraft display system in accordance with the subject disclosure.
Figure 2B:
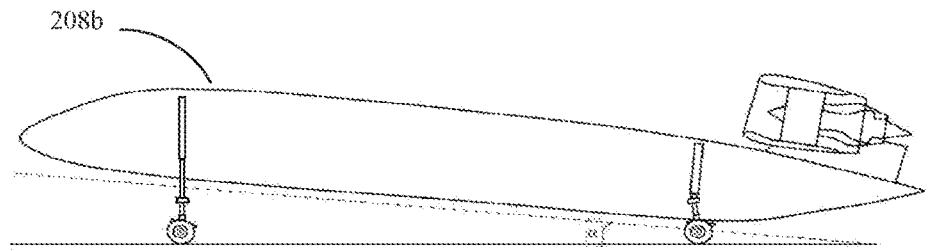

Referring now FIGS. 2A-B, an exemplary embodiment of an aircraft display system 200 is described. In one or more embodiments, aircraft display system 156 may include a screen 200a. A "screen" for the purposes of this disclosure is the information that is capable of being displayed within a border of a device display such as aircraft display system 200. A user may navigate through different screens 204a-b wherein each screen 204a-b may contain new or differing information or data. For example, a first screen 204a may display information aircraft 208a depict an aircraft 208a such as a BWB. In one or more embodiments, portions of aircraft 208a may contain call outlines 212a that display information associated with one or more systems of aircraft 208a. For example, and without limitation, call outline may display information such as the aircraft orientation 140. In one or more embodiments, aircraft display system 200 may include a synoptic display wherein a user may select a system on aircraft 208a and be navigated to another screen 208a-b. For example, a user may select an aircraft orientation 140 depiction within screen 208a wherein the user may be navigated to screen 208b and given information associated with the aircraft orientation 140. In one or more embodiments, aircraft display system 156 may display flashing signs and/or change colors of various call outlines 212a in order to inform a pilot that a particular system requires attention. In one or more embodiments, the pilot may select the system requiring attention and be navigated to another screen 208b wherein the pilot or user may be given information associated with the system. In this instance, screen 208b may display aircraft orientation 140 of an aircraft. In one or more embodiments, screen may depict an aircraft 208b rotated about an angle wherein a pilot may visually understand the angle of rotation of the aircraft. In one or more embodiments, screen 208b may further display information associated with aircraft orientation 140 such as but not limited to, the speed of the aircraft the ideal orientation and the like.

Figure 2C:
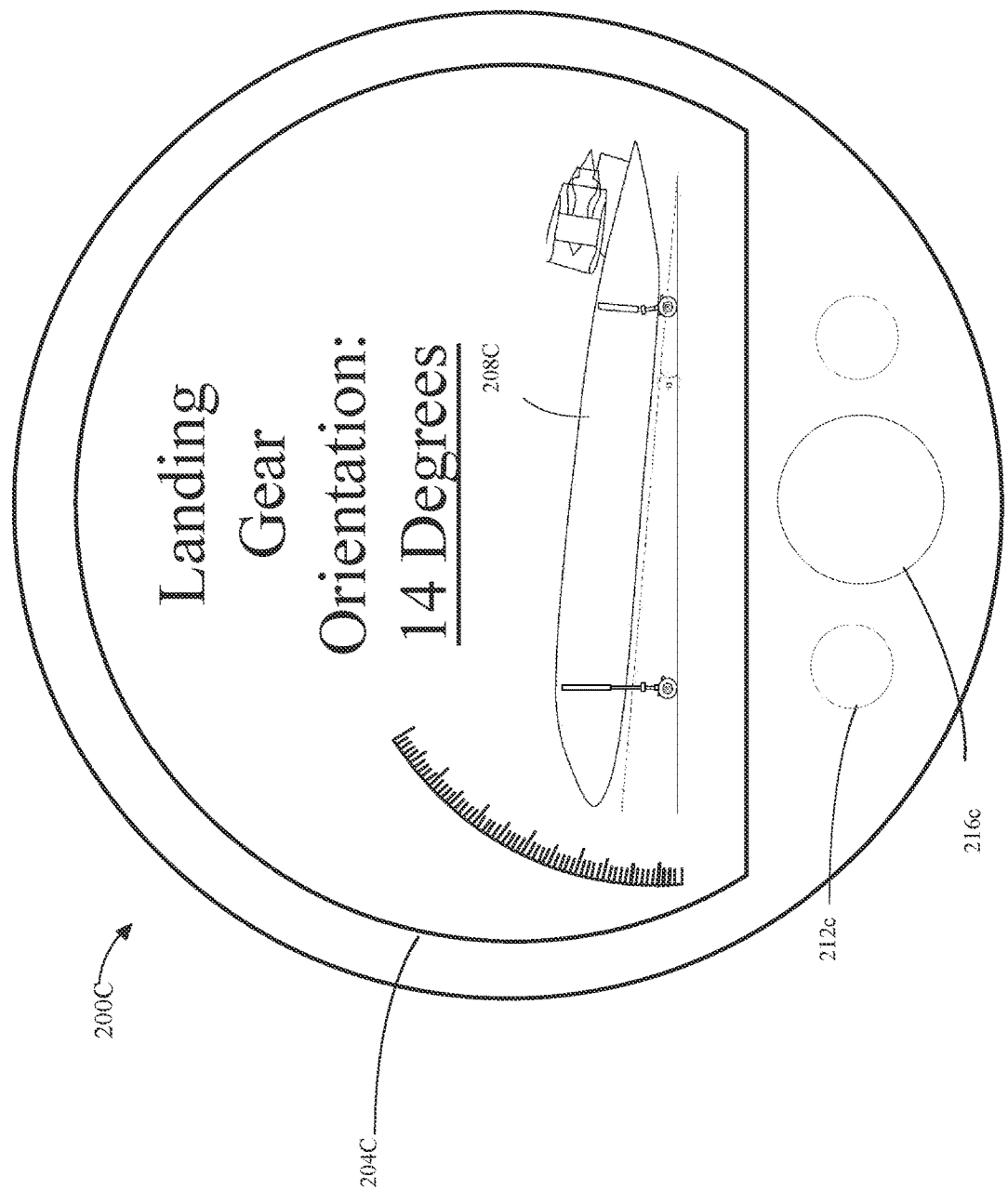

Referring now to FIG. 2C, yet another exemplary embodiment of an aircraft display system 200c is described. In this instance, aircraft display system may include a display screen 204c. In one or more embodiments, Display screen 204c may include a gauge wherein the positioning of aircraft 208c may indicate the orientation of the aircraft. In one or more embodiments, display screen 208c may include a static screen including a dial situated along one or more angles. In one or more embodiments, the positioning of the dial may be correlated to the angle of the aircraft. In one or more embodiments, the dial may replace the aircraft 208c. In one or more embodiments, aircraft 208c may rotate about an axis wherein the positioning of aircraft 208c may be correlated to the positioning of the actual aircraft. In one or more embodiments, aircraft 208c may act as a dial wherein the dial may rotate varying angles to indicate the rotation of the aircraft. In one or more embodiments, aircraft display system 200c may provide a visual illustration of the orientation of an aircraft. In one or more embodiments, the shape and size of the aircraft display system 200c may allow for the placement of aircraft display system 200c near other aircraft instruments such as airspeed indicators, altimeters, vertical speed indicators and the like. In one or more embodiments, aircraft display system 200c may include an audio output device 212c such as a speaker wherein the audio output device 212c may be configured to audibly notify a pilot when aircraft notification system requires attention. In one or more embodiments, aircraft notification system 200c may further include a light emitting device 216c wherein the light emitting device 216c may be configured to emit a light to visually capture the attention of the pilot. In one or more embodiments, light emitting device may emit differing colors wherein a color such as green for example may indicate that the aircraft is functioning properly, an indication of yellow may indicate that the aircraft may require attention soon and a light of red may indicate that the aircraft requires attention. In one or more embodiments, light emitting device 216c may emit light in pulses and/or in tandem with audio output device 212c.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Figure 3:
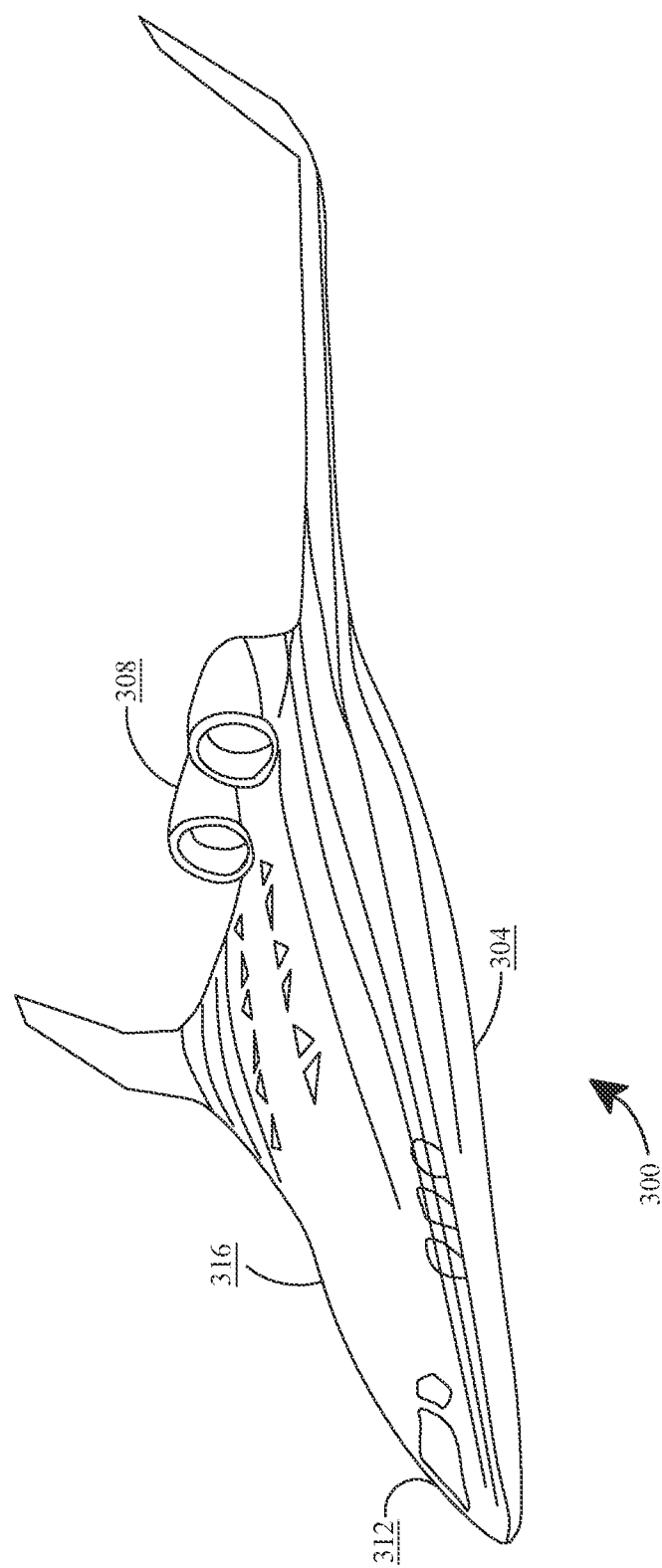
FIG. 3 is a schematic of an exemplary blended wing aircraft.

Referring to FIG. 3, an exemplary blended wing aircraft 300 is illustrated. In one or more embodiments, an aircraft as described above in reference to FIG. 1, may include aircraft 300. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 312 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, since function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein, an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFcPO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFcPO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 312 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-Based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 4A-4B, a side view of a blended wing aircraft with a landing gear system is illustrated. Landing gear system 400 may include a main gear 405 that can squat and/or a nose gear 410 that can extend to mechanically provide the desired angle-of-attack (AOA or a) for takeoff and/or landing. In some examples, landing gear system 400 can comprise two or more main gears 405a and one or more nose gear 410. In some cases, landing gear system 400 may include standard oleo struts 415 (e.g., airfoil pneumatic struts) mounted on one or more actuators 420. In some embodiments, the actuators 420 can be cylinders that are hydraulically or pneumatically linked, such that when one hydraulic cylinder 420 collapses the other hydraulic cylinder 420 extends, and vice versa. In some embodiments, the hydraulic cylinder 420 can be independently controlled to work in concert. In a preferred embodiment, the hydraulic cylinder 420 can comprise hydraulic cylinders that are also hydraulically linked.

As shown in FIG. 4A, therefore, in the level, or ground, configuration, the aircraft can be substantially level. In this configuration, the hydraulic cylinders 420 can be positioned such that the oleo struts 415 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, when the aircraft is on the ground, the nose hydraulic cylinder 420b is fully retracted and the main hydraulic cylinder 420a is fully extended. As discussed below, in some examples, for safety purposes, the hydraulic cylinders 420 can be locked in the level position anytime the aircraft is on the ground and below a predetermined speed unless otherwise overridden—e.g., for maintenance purposes.

As shown in FIG. 4B, however, to enable the aircraft to rotate for takeoff or landing, the main hydraulic cylinder 420a can collapse and the nose hydraulic cylinder 420b can extend to provide the desired AOA. In this configuration, as with conventional landing gear, the oleo struts 415 react to impacts and undulations on the ground, but these motions are measured in inches, quite small relative to the stroke needed for the tilting system. As the hydraulic cylinders collapse and extend, however, the overall height of the strut/cylinder assembly 425 changes. Thus, as the main hydraulic cylinder(s) 420a (i.e., two or more main hydraulic cylinder 420a for the two or more main gears 405a) retracts, the rear strut/cylinder assembly 425a squats. Conversely, as the nose hydraulic cylinder 420b (i.e., the cylinder for the nose gear 410) extends, the nose strut/cylinder assembly 425b extends. This has the effect of lowering the rear of the aircraft and raising the front of the aircraft to simulate takeoff rotation and/or landing flare.

Notably, however, this attitude is achieved with the landing gear 405, 410 still on the ground. In addition, as discussed below, the location and size of the hydraulic cylinders 420 can be such that they are essentially in equilibrium about the CG. In this manner, the system 400 can rotate the aircraft with very little force provided by the aerodynamic surfaces of the wing. This (1) overcomes the aforementioned issues related to overcoming a large LMG and (2) does so with the wing in a more aerodynamically efficient configuration. Because rotation requires much less negative lift and thus, deflection of the elevons 110 (or elevons in a tailless configuration) and/or flaps 115, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 405 has cleared the tarmac, the location of the main gear 405 is no longer relevant from an aerodynamic standpoint. Once aloft, the location of the main gear 405 is relevant only from a weights and balances standpoint, which can be accounted for with fuel, cargo, and/or passenger weight, among other things. At or before liftoff, therefore, the flight control surfaces can be positioned to provide the necessary aerodynamic forces to maintain the desired AOA for climb out.

Of course, while shown and described with hydraulic cylinders 420, pneumatic cylinders and other types of linear or rotary actuators could be used. Landing gear system 400 could utilize linear actuators, for example, electrically driven by the aircraft's electrical system. Landing gear system 400 could also utilize servo motors, for example, with a rack and pinion or pushrod actuation to the landing gear 405, 410. Indeed, rather than using separate hydraulic cylinders 420, as shown, landing gear system 400 could use lengthened versions of the existing oleo struts 415 interconnected in a similar manner. This configuration might reduce weight and complexity if sufficient space is available in the airplane for the lengthy struts 415 and the volume swept by the rotation angle needed for retraction. Thus, any type of mechanism that can enable the main gear 405 to squat and/or the nose gear 410 to lift can provide the necessary AOA.

Figure 5:
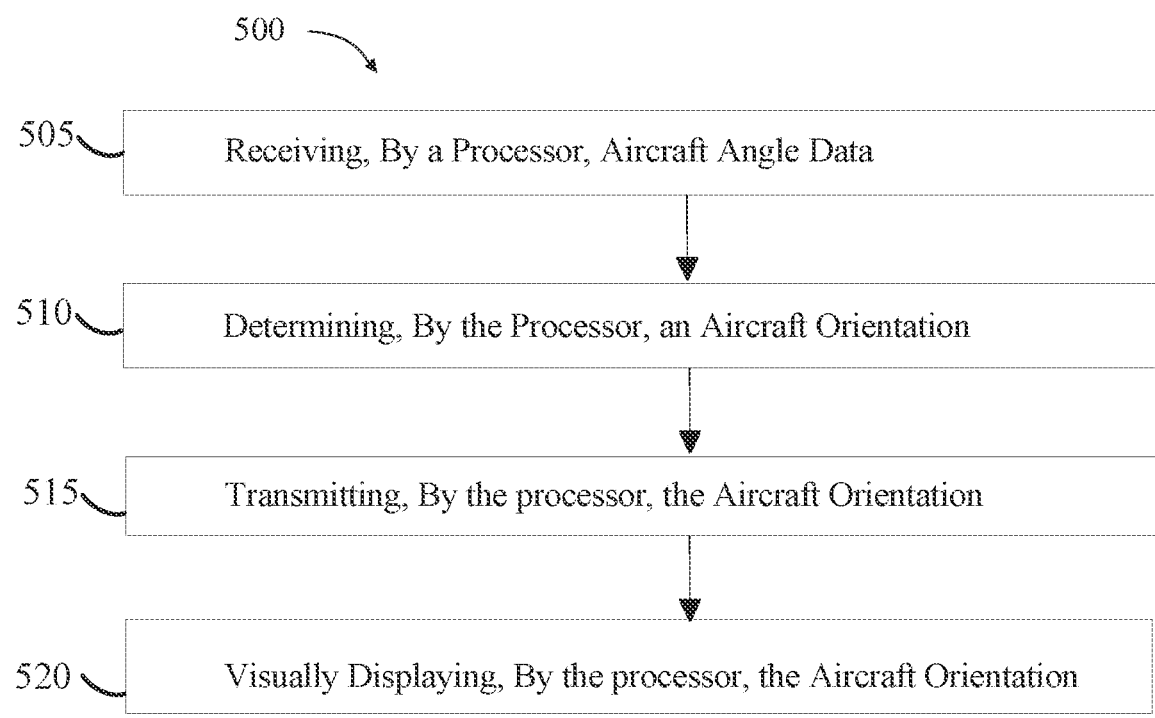
FIG. 5 is a flow diagram illustrating an exemplary embodiment of a method of use for an aircraft notification system.

Referring now to FIG. 5, a method 500 of use for an aircraft notification system is described. At step 505, method 500 includes receiving, by a processor, aircraft angle data from a blended wing body aircraft (BWB) having a main body and a wing with no clear demarcation between the wings and the main body along a leading edge of the aircraft. In one or more embodiments, the aircraft angle data includes landing gear data, the landing gear data having a length of a nose gear of the BWB and a length of a main gear of the BWB. In one or more embodiments, receiving, by the processor, the aircraft angle data further includes receiving gyroscopic data from one or more gyroscopic sensors. In one or more embodiments, the aircraft angle data further includes aircraft velocity. In one or more embodiments, wherein the BWB includes a landing gear system, the landing gear system having a nose gear disposed proximate a front of the aircraft, the nose gear controllably movable between a first position in which the nose gear is at an upper limit, and a second position in which the nose gear is at a lower limit and a main gear disposed proximate a rear of the aircraft, the main gear controllably movable between a third position, in which the main gear is at the lower limit, and a fourth position, in which the main gear is at the upper limit, wherein, in a ground position, the nose gear is in the first position and main gear is in the third position and a fuselage of the aircraft is substantially level with the ground and wherein, in a high lift position, the nose gear is in the second position and the main gear is in the fourth position and the fuselage of the aircraft is rotated to a positive deck angle with respect to the ground. In one or more embodiments, the aircraft angle data includes weight on wheel data. This may be implemented with reference to FIGS. 1-5 and without limitation.

With continued reference to FIG. 5, at step 510 method 500 includes determining, by the processor, an aircraft orientation as a function of the aircraft angle data, wherein the aircraft orientation includes the orientation of the BWB about a horizontal and/or nominal horizontal axis while the BWB is in contact with a ground surface. In one or more embodiments, determining, by the processor, the aircraft orientation as a function of the aircraft angle data includes comparing the weight on wheel data to a weight threshold. In one or more embodiments, determining, by the processor, the aircraft orientation includes comparing the landing gear data to the gyroscopic data. In one or more embodiments, determining, by the processor, the aircraft orientation includes comparing the aircraft velocity to one or more velocity thresholds. This may be implemented with reference to FIGS. 1-5 and without limitation.

With continued reference to FIG. 5, at step 515 method 500 includes transmitting, by the processor, the aircraft orientation to an aircraft display system. This may be implemented with reference to FIGS. 1-5 and without limitation.

With continued reference to FIG. 5, at step 520, method 500 includes visually displaying, by the processor, the aircraft orientation through an aircraft display system. In one or more embodiments, visually displaying, by the processor, the aircraft orientation through the aircraft display system includes generating a synoptic display of the aircraft orientation. In one or more embodiments, the aircraft display system includes a crew alerting system (CAS). In one or more embodiments, visually displaying, by the processor, the aircraft orientation through the aircraft display system includes displaying an alert through the aircraft display system upon the occurrence of a takeoff and landing event. In one or more embodiments, displaying the alert through the aircraft display system upon the occurrence of a takeoff and landing event comprises comparing the aircraft orientation to one or more take and landing thresholds. This may be implemented with reference to FIGS. 1-5 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
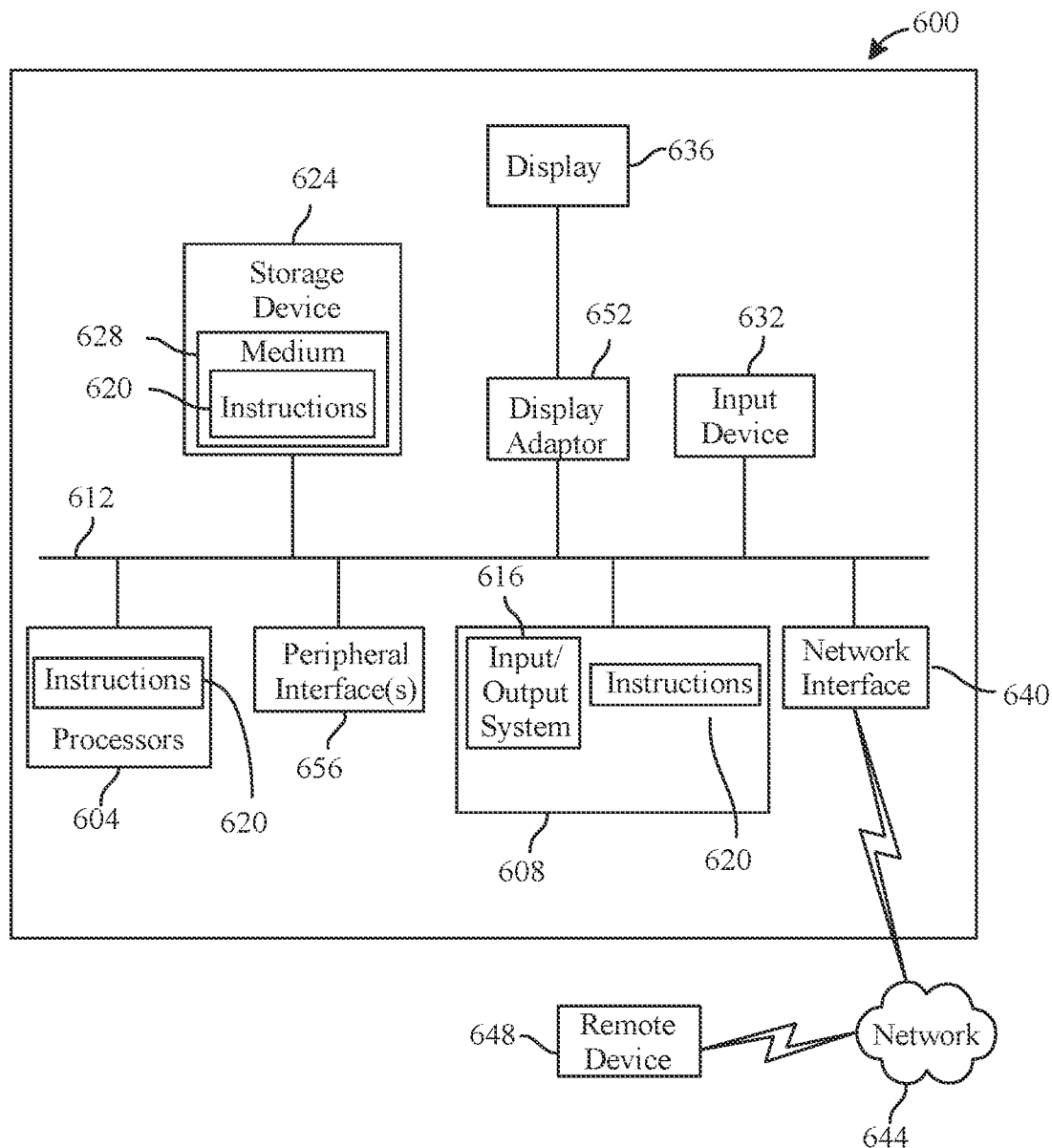
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft notification system, the aircraft notification system comprising:
    a processor; and
    a memory communicatively connected to the processor, the memory containing instructions configuring the processor to:
        receive aircraft angle data from a blended wing body aircraft (BWB) having a main body and a wing with no clear demarcation between the wing and the main body along a leading edge of the aircraft;
        determine an aircraft orientation as a function of the aircraft angle data, wherein the aircraft orientation comprises at least a pitch angle of the BWB while the BWB is in contact with a ground surface;
        transmit the aircraft orientation to an aircraft display system; and
        visually display the aircraft orientation through the aircraft display system.

2. The aircraft notification system of claim 1, wherein the aircraft angle data comprises landing gear data, the landing gear data comprising a length of a nose gear of the BWB and a length of at least one main gear of the BWB.

3. The aircraft notification system of claim 1, wherein:
    the aircraft angle data comprises weight on wheel data (WoW); and
    determining the aircraft orientation as a function of the aircraft angle data comprises comparing the WoW data to a weight threshold.

4. The aircraft notification system of claim 1, wherein visually displaying the aircraft orientation through the aircraft notification system comprises generating a synoptic display.

5. The aircraft notification system of claim 1, wherein the aircraft display system comprises a crew alerting system (CAS), the CAS configured to display information associated with the aircraft orientation.

6. The aircraft notification system of claim 1, wherein:
    the aircraft angle data further comprises an indicated airspeed; and
    determining the aircraft orientation comprises determining optimal orientation data as a function of the indicated airspeed.

7. The aircraft notification system of claim 2, wherein:
    receiving the aircraft angle data further comprises receiving gyroscopic data from one or more gyroscopic sensors; and
    determining the aircraft orientation comprises comparing the landing gear data to the gyroscopic data.

8. The aircraft notification system of claim 1, wherein the BWB comprises a landing gear system, the landing gear system comprising:
    a nose gear disposed proximate a front of the BWB, the nose gear controllably movable between a first position in which the nose gear is at an upper limit, and a second position in which the nose gear is at a lower limit; and
    a main gear disposed proximate a rear of the BWB, the main gear controllably movable between a third position, in which the main gear is at the lower limit, and a fourth position, in which the main gear is at the upper limit;
    wherein, in a ground position, the nose gear is in the first position and main gear is in the third position and a fuselage of the BWB is substantially level with the ground; and
    wherein, in a high lift position, the nose gear is in the second position and the main gear is in the fourth position and the fuselage of the BWB is rotated to a positive deck angle with respect to the ground.

9. The aircraft notification system of claim 1, wherein visually displaying the aircraft orientation through the aircraft display system comprises displaying an alert through the aircraft display system upon the occurrence of a takeoff or landing event.

10. The aircraft notification system of claim 9 wherein displaying an alert through the aircraft display system upon the occurrence of a takeoff or landing event comprises comparing the aircraft orientation to one or more takeoff and landing thresholds.

11. A method of use for an aircraft notification system, the method comprising:
receiving, by a processor, aircraft angle data from a blended wing body aircraft (BWB) having a main body and a wing with no clear demarcation between the wing and the main body along a leading edge of the aircraft;
determining, by the processor, an aircraft orientation as a function of the aircraft angle data, wherein the aircraft orientation comprises at least a pitch angle of the BWB while the BWB is in contact with a ground surface;
transmitting, by the processor, the aircraft orientation to an aircraft display system; and
visually displaying, by the processor, the aircraft orientation through an aircraft display system.

12. The method of claim 11, wherein the aircraft angle data comprises landing gear data, the landing gear data comprising a length of a nose gear of the BWB and a length of at least one main gear of the BWB.

13. The method of claim 11, wherein:
the aircraft angle data comprises weight on wheel (WoW) data; and
determining, by the processor, the aircraft orientation as a function of the aircraft angle data comprises comparing the WoW data to a weight threshold.

14. The method of claim 11, wherein visually displaying, by the processor, the aircraft orientation through the aircraft display system comprises generating a synoptic display of the aircraft orientation.

15. The method of claim 11, wherein the aircraft display system comprises a crew alerting system (CAS), the CAS configured to display information associated with the aircraft orientation.

16. The method of claim 11, wherein:
the aircraft angle data further comprises an indicated airspeed; and
determining, by the processor, the aircraft orientation comprises comparing the indicated airspeed to one or more velocity thresholds.

17. The method of claim 12, wherein:
receiving, by the processor, the aircraft angle data further comprises receiving gyroscopic data from one or more gyroscopic sensors; and
determining, by the processor, the aircraft orientation comprises comparing the landing gear data to the gyroscopic data.

18. The method of claim 11, wherein the BWB comprises a landing gear system, the landing gear system comprising:
a nose gear disposed proximate a front of the BWB, the nose gear controllably movable between a first position in which the nose gear is at an upper limit, and a second position in which the nose gear is at a lower limit; and
a main gear disposed proximate a rear of the BWB, the main gear controllably movable between a third position, in which the main gear is at the lower limit, and a fourth position, in which the main gear is at the upper limit;
wherein, in a ground position, the nose gear is in the first position and main gear is in the third position and a fuselage of the BWB is substantially level with the ground; and
wherein, in an angle-of-attack (AOA) position, the nose gear is in the second position and the main gear is in the fourth position and the fuselage of the BWB is rotated to a positive AOA with respect to the ground.

19. The method of claim 11, wherein visually displaying, by the processor, the aircraft orientation through the aircraft display system comprises displaying an alert through the aircraft display system upon the occurrence of a takeoff and landing event.

20. The method of claim 19 wherein displaying the alert through the aircraft display system upon the occurrence of a takeoff and landing event comprises comparing the aircraft orientation to one or more takeoff and landing thresholds.

* * * * *